Dec. 8, 1959

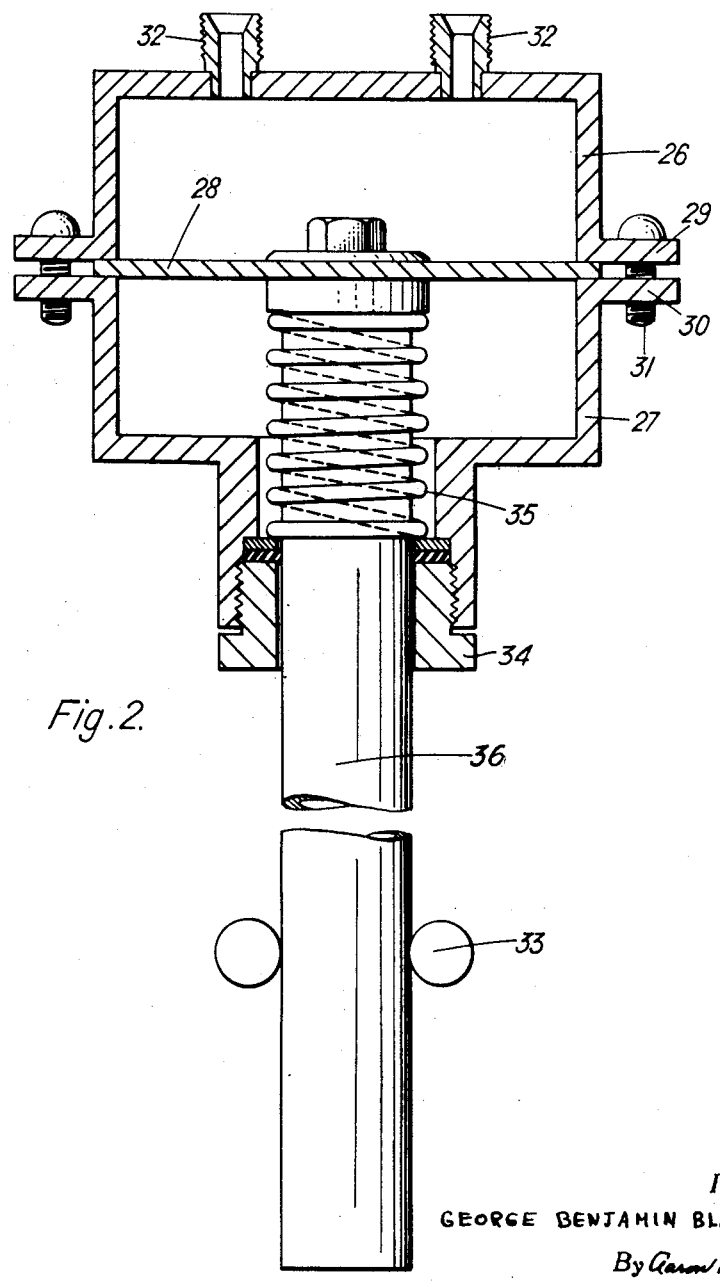

G. B. BLACKHURST 2,916,654

ELECTRIC ARC WELDING

Filed Feb. 7, 1957

3 Sheets-Sheet 3

Inventor
GEORGE BENJAMIN BLACKHURST
By Aaron P. Townshend
Attorney

# United States Patent Office 2,916,654
Patented Dec. 8, 1959

2,916,654
ELECTRIC ARC WELDING

George Benjamin Blackhurst, Middlesex, England, assignor to The British Oxygen Company Limited, a British company Application February 7, 1957, Serial No. 638,833

Claims priority, application Great Britain February 13, 1956

5 Claims. (Cl. 314—61)

This invention relates to apparatus for electric arc welding and more particularly for automatic and semi-automatic electric arc welding in which an arc is struck between a mechanically supported electrode and a workpiece.

In the electric arc welding of metals, whether using a consumable or a non-consumable electrode, it is essential that the arc length should remain substantially constant during the arc welding process since variation in arc length will cause fluctuation in the arc voltage. The arc voltage has a definite bearing on the penetration of the workpiece and on the width of weld and it is essential that the arc voltage should be substantially constant to obtain a satisfactory weld.

It is an object of the present invention to provide simple apparatus for the automatic control of arc length in such processes to maintain this length substantially at a predetermined value.

According to the present invention, apparatus for automatically maintaining a substantially constant arc length between a mechanically supported electrode and a workpiece, comprises a pressure responsive member adapted under the influence of a varying applied pressure to raise or lower a head supporting the electrode, and means responsive to the arc voltage for controlling the pressure applied to the pressure responsive member to raise or lower the head supporting the electrode to maintain the arc length substantially constant.

Figure 1:
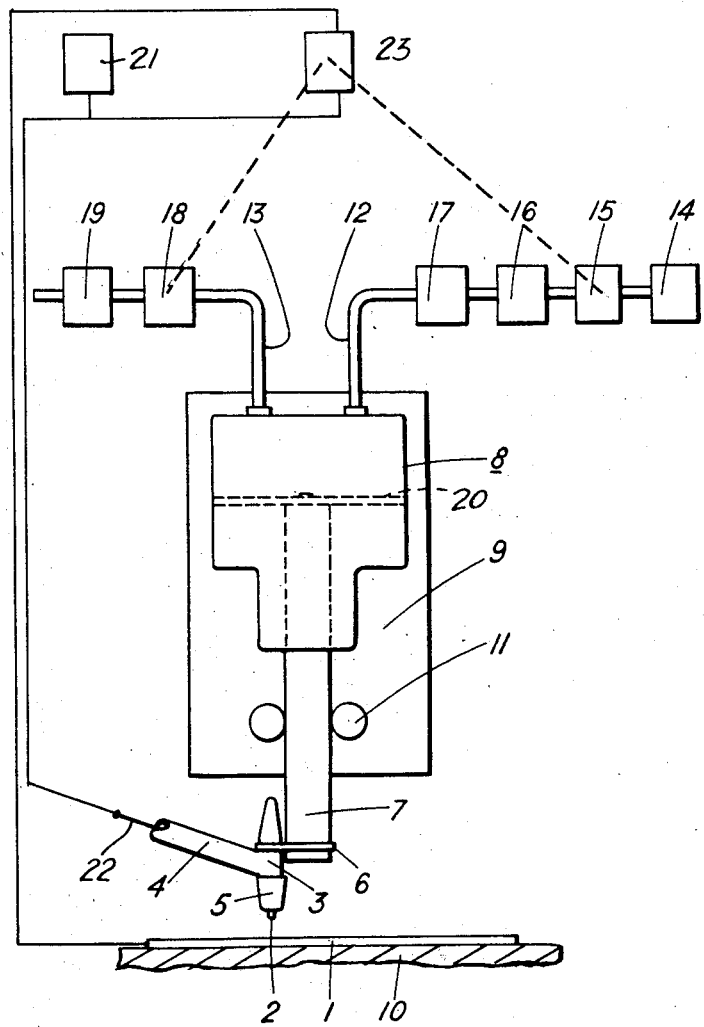
Figures 3, 4:
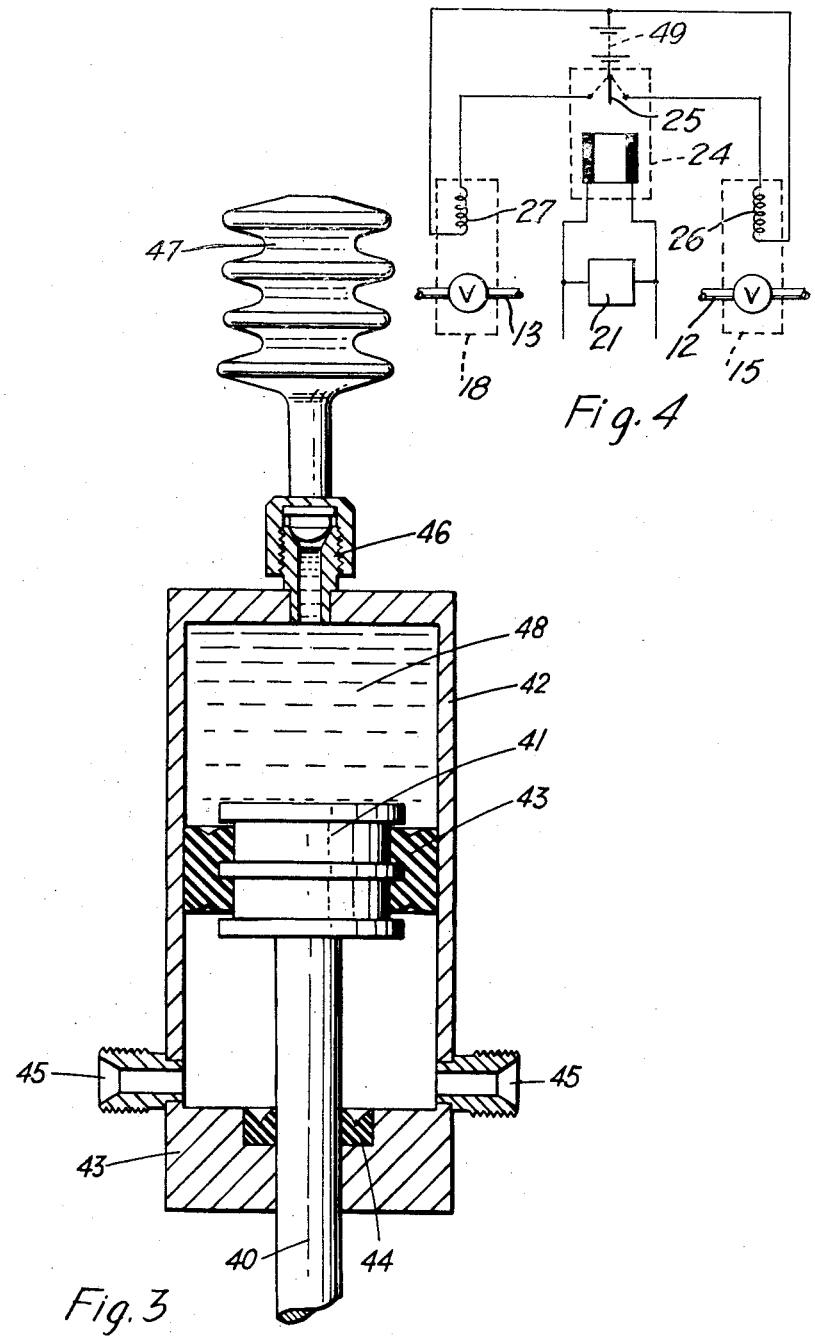

Apparatus for electric arc welding in accordance with the present invention will now be described by way of example with reference to the four somewhat diagrammatic figures of the accompanying drawings in which:

Figure 1 shows the general arrangement of an apparatus for electric arc welding with a non-consumable electrode, Figures 2 and 3 respectively show sectional elevations of first and a second constructions of actuating device for use in the arrangement shown in Figure 1, and Figure 4 shows a diagram of the control circuit of the apparatus.

Referring now to Figure 1 of the drawings, a metallic workpiece to be electric arc welded is indicated at 1, and a non-consumable electrode of tungsten from which an arc is to be struck to the workpiece 1 is indicated at 2. The electrode 2 is mounted in a head 3 and connected to a source 21 of electric current by a conductor 22 extending through the tube 4. Shielding gas is passed through the tube 4 and directed by a nozzle 5 to surround the electric arc. The workpiece 1 is also connected to the source of electric current so that during operation an electric arc is struck between the electrode 2 and the workpiece 1. The shielding gas is preferably an inert gas such as argon or helium possibly with small additions of oxygen.

The head 3 is secured by a suitable fastening device 6 to a tube 7 extending downwardly from an actuating device 8 which is adapted to position the head 3 in relation to the workpiece 1. The actuating device 8 is mounted on a base 9 which is fixed relatively to a support 10 for the workpiece 1, and rollers 11 mounted on the base 9 guide the tube 7 in its movement relatively to the base 9. Inlet and outlet fluid lines for the actuating device are indicated respectively at 12 and 13, the inlet line 12 being connected to a source of air pressure 14 by way of an inlet valve 15, a pressure regulator 16 and a needle valve 17; and the outlet line 13 being arranged to discharge to atmosphere by way of an outlet valve 18 and a needle valve 19. The actuating device 8 includes a pressure responsive member in the form of a flexible diaphragm 20 whose periphery is secured to the housing of the actuating device and whose centre is secured to the upper end of the tube 7. The diaphragm 20 forms one wall of a pressure chamber formed by the upper part of the actuating device, and the tube 7 is raised or lowered by flexure of the diaphragm.

In use when the arc length is constant there is a constant flow of gas from the source 14 through the upper part of the actuating device to maintain a force on the diaphragm 20, this being opposed by biassing means not shown in Figure 1. Two forms of biassing means are shown in Figures 2 and 3.

The inlet and outlet valves 15 and 18 are adapted to be operated by control means 23 responsive to the arc voltage between the electrode 2 and the workpiece 1. The control means 23 may for example be a voltage sensitive relay 24 having a contact member 25 arranged to occupy a neutral position when the arc length is constant at the predetermined value. This arrangement is shown in Fig. 4. In this case the inlet and outlet valves 15 and 18 may each include an operating solenoid, 26 and 27 respectively, one or other of the solenoids being energised by a power source 49 when the contact member 25 of the voltage sensitive relay moves from its neutral position to one of its operated positions, shown dotted in Fig. 4.

The control means is such that when the arc length is normal the inlet valve 15 and the outlet valve 18 are both open. If the arc length increases substantially, then the control means acting in response to the increase of arc voltage causes closure of outlet valve 18 and the resultant increase of pressure in the actuating device above the diaphragm 20 forces the centre of the diaphragm 20, the tube 7 and the head 3 downwardly to return the arc length to its original length. As the arc voltage returns to its original value the control means causes the outlet valve 18 to reopen and so prevent further increase of pressure above the diaphragm 20. In response to decrease of arc voltage the control means causes closure of inlet valve 15 thus allowing the biassing means referred to above to raise the centre of the diaphragm 20, the tube 7 and the head 3. When the arc length and hence the arc voltage returns to its original value the control means causes the inlet valve 16 to reopen and so prevent further decrease of pressure above the diaphragm 20. The speed of response of the apparatus may be adjusted by means of the needle valves 17 and 19.

It will be appreciated that the apparatus may also be used for welding with a consumable electrode or for electric arc cutting by suitable modification of the head 3.

The first construction of actuating device is shown in Figure 2 and comprises a pressure casing formed of upper and lower parts 26 and 27 in which is housed a pressure-responsive member in the form of a disc-like rubber diaphragm 28. The periphery of the diaphragm is clamped between opposed flanges 29 and 30 of the upper and lower parts 26 and 27 respectively which are held together by bolts 31, the diaphragm thus forming one wall of a pressure chamber formed by the upper part 26. Two bushings 32 are secured in apertures in the upper part 26 and are externally screw-threaded to co-operate with inlet and outlet supply lines such as those shown at 12 and 13 in Figure 1. A tube 36 which corresponds to tube 7 shown in Figure 1 and may be guided by rollers 33 extends into the lower part 27 of the pressure casing and is bolted to the centre of the diaphragm 28. A bushing 34 through which the tube 36 extends is screwed into the lower part 27 and supports the lower end of a helical compression spring 35 within the pressure casing. The upper end of this spring abuts a washer bolted between the upper end of tube 36 and the diaphragm 28.

The actuating device shown in Figure 2 operates in the same manner as the actuating device 8 shown in Figure 1 whose operation is described above, the spring 35 constituting the biassing means which acts on the pressure-responsive member in opposition to the air under pressure in the upper part 26 of the pressure casing.

In the second construction of actuating device which is shown in Figure 3 the biassing means is mainly gravity. A tube 40 which is adapted to support at its lower end a head for electric arc welding is provided at its upper end with a pressure responsive member in the form of a piston 41, the piston being disposed within a cylinder or tubular casing 42 and spaced from the wall of the casing by a gasket 43. The lower end of the casing 42 is closed by a cap 49 through an aperture in which extends tube 40 surrounded by a gasket 44. Inlet and outlet bushings 45 are secured in apertures in the casing 42 below the level of the piston 41, and a further bushing 46 is secured in a central aperture in the upper end of this casing. To this bushing 46 is connected a bellows 47 of oil resistant rubber communicating with the interior of the casing 42 above the piston 41 which is filled with oil 48. The actuating device may replace the actuating device 8 in the arrangement shown in Figure 1, the inlet and outlet bushings 45 being connected to gas lines 12 and 13 so that air in the pressure chamber exerts an upward force on the underside of the piston 41. If the arc length increases from a value predetermined by the control means, this increase being due for example to an inequality in the surface of the workpiece 1, the control means operates to close the inlet valve 15 and so reduce the upward force acting on the underside of the piston 41. The weight of the piston (and oil) and anything supported thereby, together with any elastic restoring force in the rubber bellows 47 act to lower the piston 41 to a position in which the arc length has its predetermined value. The control means then opens the inlet valve 15. If the arc length decreases from the predetermined value the control means maintains the outlet valve 18 closed until the force acting on the underside of the piston 41 has raised the piston to a sufficient extent to return the arc length to the predetermined value.

I claim:

1. Apparatus for automatically maintaining a substantially constant arc length between a mechanically supported electrode and a workpiece, comprising a chamber, a pressure responsive member forming one wall of the chamber and adapted in response to a varying gas pressure in the chamber to move said electrode with respect to said workpiece, biasing means acting on the pressure responsive member to oppose the gas pressure in the chamber, an inlet port in said chamber adapted to be connected to a source of gas pressure, inlet valve means associated with said inlet port, an outlet port in said chamber, outlet valve means associated with said outlet port, and control means responsive to the arc voltage and arranged to operate said inlet and outlet valve means to control the pressure applied to the pressure responsive member whereby said electrode may be moved with respect to said workpiece to maintain a substantially constant arc length.

2. Apparatus for automatically maintaining a substantially constant arc length as claimed in claim 1, wherein the pressure responsive member comprises a flexible diaphragm which is arranged to be flexed by a decrease or an increase of pressure within the chamber to raise or lower the electrode, flexure of the diaphragm to lower the electrode being resisted by said biassing means.

3. Apparatus for automatically maintaining a substantially constant arc length as claimed in claim 1, wherein the chamber is a cylinder, and the pressure responsive member is a piston slidable in the cylinder and arranged to raise or lower the electrode when sliding in the cylinder, movement of the piston to lower the electrode being resisted by said biassing means.

4. Apparatus for automatically maintaining a substantially constant arc length as claimed in claim 2, wherein the biassing means comprises a compression spring.

5. Apparatus for automatically maintaining a substantially constant arc length as claimed in claim 3, wherein said biassing means comprises the weight of the piston and anything supported thereby.

References Cited in the file of this patent

UNITED STATES PATENTS 2,761,956   Potter et al. _____ Sept. 4, 1956